US008855681B1

(12) United States Patent
George et al.

(10) Patent No.: US 8,855,681 B1
(45) Date of Patent: Oct. 7, 2014

(54) USING MULTIPLE APPLICATIONS TO PROVIDE LOCATION INFORMATION

(75) Inventors: Michael M. George, Mercer Island, WA (US); Dana C. LoPiccolo-Giles, Seattle, WA (US); Gustavo Eduardo Lopez, Seattle, WA (US); Simoina D. Vasen, Seattle, WA (US); Andrew Russell Turner, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 63 days.

(21) Appl. No.: 13/452,363

(22) Filed: Apr. 20, 2012

(51) Int. Cl.
*H04W 24/00* (2009.01)

(52) U.S. Cl.
USPC .................. 455/456.3; 455/456.1; 455/456.2

(58) Field of Classification Search
USPC ............ 455/456.1–456.8, 457; 705/26.7, 347
See application file for complete search history.

(56) References Cited

U.S. PATENT DOCUMENTS

| | | | |
|---|---|---|---|
| 6,269,343 B1 | 7/2001 | Pallakoff | |
| 7,668,747 B2 | 2/2010 | Murphy et al. | |
| 7,672,897 B2 | 3/2010 | Chung et al. | |
| 2002/0143930 A1* | 10/2002 | Babu et al. | 709/224 |
| 2003/0148771 A1* | 8/2003 | de Verteuil | 455/456 |
| 2006/0270421 A1* | 11/2006 | Phillips et al. | 455/457 |
| 2007/0150444 A1* | 6/2007 | Chesnais et al. | 707/3 |
| 2007/0270166 A1* | 11/2007 | Hampel et al. | 455/456.3 |
| 2008/0081640 A1* | 4/2008 | Tran et al. | 455/456.3 |
| 2008/0153512 A1* | 6/2008 | Kale et al. | 455/456.3 |
| 2008/0248815 A1* | 10/2008 | Busch | 455/456.5 |
| 2008/0270224 A1* | 10/2008 | Portman et al. | 705/10 |
| 2010/0082247 A1* | 4/2010 | Klein et al. | 701/209 |
| 2010/0130233 A1* | 5/2010 | Parker | 455/456.3 |
| 2010/0289659 A1* | 11/2010 | Verbil | 340/670 |
| 2010/0325194 A1* | 12/2010 | Williamson et al. | 709/203 |
| 2011/0084876 A1* | 4/2011 | Ische et al. | 342/357.31 |
| 2011/0143776 A1* | 6/2011 | Shankaranarayanan et al. | 455/456.3 |
| 2011/0312344 A1* | 12/2011 | McCahill et al. | 455/456.1 |
| 2011/0320307 A1* | 12/2011 | Mehta et al. | 705/26.7 |
| 2012/0008526 A1* | 1/2012 | Borghei | 370/254 |
| 2012/0136865 A1* | 5/2012 | Blom et al. | 707/739 |
| 2012/0220314 A1* | 8/2012 | Altman et al. | 455/456.3 |
| 2012/0233103 A1* | 9/2012 | Ashrafi | 706/16 |
| 2012/0253656 A1* | 10/2012 | Brandt | 701/410 |
| 2012/0253668 A1* | 10/2012 | Sheha et al. | 701/465 |
| 2012/0284322 A1* | 11/2012 | Laborczfalvi et al. | 709/202 |
| 2012/0309376 A1* | 12/2012 | Huang et al. | 455/418 |
| 2012/0317104 A1* | 12/2012 | Radlinski et al. | 707/724 |
| 2013/0012232 A1* | 1/2013 | Titus et al. | 455/456.2 |
| 2013/0040654 A1* | 2/2013 | Parish | 455/456.1 |
| 2013/0061251 A1* | 3/2013 | Schwartz et al. | 719/320 |
| 2013/0067600 A1* | 3/2013 | Graham et al. | 726/30 |

\* cited by examiner

*Primary Examiner* — Nathan Taylor
(74) *Attorney, Agent, or Firm* — Lee & Hayes, PLLC

(57) ABSTRACT

Methods, systems, and apparatuses for providing location information to a location server by a plurality of applications are described. The plurality of applications of a computing device determines location information associated with the computing device, such as by querying location hardware of the computing device. The applications cause transmission of the location information to a location service via a communication network. The location service utilizes the location information in various ways to target communications to users associated with the computing devices.

31 Claims, 6 Drawing Sheets

USING MULTIPLE APPLICATIONS TO PROVIDE LOCATION INFORMATION

BACKGROUND

Mobile devices, such as mobile phones, often have location capabilities that identify the location of the mobile device. For example, a mobile device may have an installed global positioning system (GPS) receiver. Applications installed on the mobile device can access the GPS receiver to determine the mobile device's location coordinates. The application can then provide application-specific functionality using the location coordinates. In one example, an application may cause display of a map and an indication of the current location of the mobile device within the map display. In another example, a social networking application may enable a user of the mobile device to "check in" at a local establishment, which causes the user's social networking information to be updated on the Internet. In another example, an application installed on the mobile device uses the mobile device's location to provide location-specific content to a user of the mobile device, such as a location-specific advertisement or other marketing material.

Other types of location capabilities besides GPS are available. In one example, the location of a mobile tower that the mobile device is connected to can be used to determine a location of the mobile device. In a similar example, a Wi-Fi network location can be used to identify a mobile device's location.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As noted above, conventional applications on a mobile device utilize the device's location capabilities to provide various functions, such as providing location-specific advertisements. But if the application is not running on the device, then the location-based functions of the application cannot be implemented. Embodiments of the present application enable multiple applications that run on the mobile device to provide location information to a location service. The multiple applications may have primary functions that are unrelated to location services. The applications may provide users with the capability to opt in and allow a secondary function of the application to query the location hardware of a mobile device and to transmit the location information to a location service.

The location service can provide location-specific services for the mobile device, such as providing the mobile device, or a user associated with the mobile device, with location-specific communications, such as advertisements or other marketing communications. By enabling multiple applications to query the location hardware, a location service is more likely to receive timely and thorough location information, thereby providing the user of the mobile device with more timely and useful information.

Users may opt in or opt out of various location services as described herein. For example, users are able to opt in or out of allowing applications to determine his or her locations, to store his or her locations, utilize his or her location information, and to receive communications such as marketing information, advertisements, or offers. Also, the user information may be secured to reduce the likelihood of tampering and/or unauthorized access to the data. In embodiments where user data is provided to third parties, the user data may be limited to only anonymous aspects, and/or only those aspects of the user's data that the user has agreed to share with third parties. For example, the user may agree to share an email address and work location with third parties but restricts the sharing a phone number, home location, and mailing address with third parties.

The techniques and systems described herein may be implemented in a number of ways. Example implementations are provided below with reference to the following figures.

Illustrative Environment for Providing Location Data to a Location Service

Figure 1:
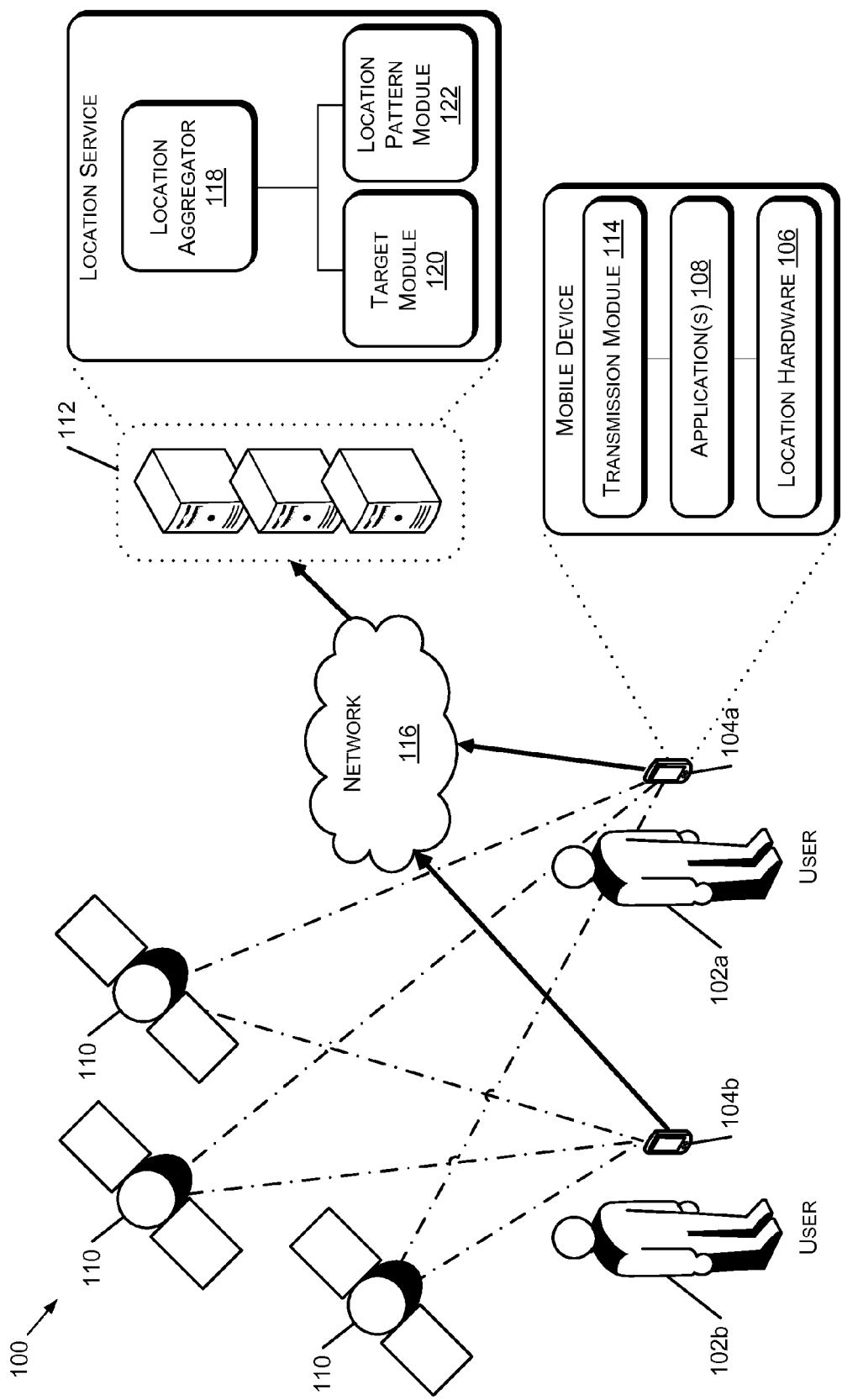
FIG. 1 shows an environment for providing location data to a location service.

FIG. 1 shows an environment 100 for providing location data to a location service. Users 102 (such as users 102*a* and 102*b*) carry mobile devices 104 (such as mobile devices 104*a* and 104*b*). The mobile devices 104 include location hardware 106 that is configured to be queried for a current location of the mobile devices 104. The mobile devices 104 include one or more application(s) 108. One or more of the application(s) 108 have primary functions such as media player, online shopping application, eBook reader application, price checker application, or other application. The application(s) 108 have a secondary, location-related function that periodically determines location data, such as by querying the location hardware 106. In embodiments, the application(s) may receive from the location hardware location data in the form of GPS coordinates. In other embodiments, the application(s) may receive signal strengths associated multiple cell phone towers and utilize the signal strengths to determine the location data of the mobile device, such as by triangulating the location from three or more mobile device towers. As used herein, "location data" includes data provided by the location hardware as well data determined from the information provided by the location hardware, such as triangulated coordinates.

In still further embodiments, the applications may determine location data from IP addresses, from Wi-Fi network associations, and so forth. The application(s) 108 may also be executable to accept input from the users 104 indicating the location. In embodiments, the application(s) 108 may be executable to determine or estimate a present location from past location data, such as based on one or more of direction, speed, time, trajectory, and so forth. This may be useful, for example, where the mobile devices 104 are unable for whatever reason to determine a current location directly (such as a loss of GPS signal).

In the example shown in FIG. 1, the application(s) 108 query a GPS receiver within the location hardware 106 for a current location of the mobile device 104. The location hardware 106 receives GPS signals from a plurality of GPS satellites 110, and utilizes those GPS signals to determine the location. The location hardware 106 provides the location data to the application(s) 108 that queried it.

The application(s) 108 are configured to cause transmission of the location information to the location service 112, such as via a transmission module 114. The transmission module 114 may be conventional communication software that enables applications to send data transmissions over network 116. In embodiments, a location service API may enable the application(s) 108 to call a function to cause the transmission of the location information to the location service 112. In these embodiments, the location service API simplifies the process of transmitting the location information to the location service 112. For example, the location service API may include a resource identifier—such as a universal resource identifier (URI) or a universal resource locator (URL)—for the location service 112. Thus, the application(s) 108 do not need to be configured with the network location of the location service 112. In the example shown in FIG. 1, however, the application(s) 108 communicate directly to the transmission module 114 without calling a location service API.

The location service 112 includes a location aggregator 118 that receives the location information from one or more mobile devices, such as the mobile device 104. The location aggregator 118 may aggregate the location data from one or more mobile devices, such as the mobile device 104. A target module 120 utilizes the location data, either directly or indirectly, to target communications to the user 102. The communications may be sent to the user 102 via email, text messaging, phone call, or by other means. In another example, an advertisement, offer for a good a service, or other marketing information is displayed by one of the application(s) 108 on the mobile device 104. In a different example, the mobile device 104 receives a social networking message, text message, or email with marketing information, which is then displayed by an appropriate messaging application on the mobile device 104. In embodiments, the communication is sent to a communication account—such as an email, social networking account, or other account—that may be received by the user 102 on a different device other than the mobile device 104. Other example communications are used without departing from the scope of embodiments, and as described in more detail elsewhere within this Detailed Description.

As described in more detail below, the target module 120 may select target communications to send to the user 102 based on one or more of a current location, current location area, a history of past locations, a predicted future location or a predicted future location area, and so forth. The target module 120 may utilize the location information to determine a speed and/or a direction of travel, and determine a communication to send to the user 102 based on such information. Other information may be utilized in embodiments, such as is described in more detail below.

A location pattern module 122 may utilize the location information to infer information from the location information. For example, the location pattern module 122 infers the location of a merchant at a particular location based on location information showing that many users, such as user 102, frequently visit a particular location. In another example, the location information is used to identify the number of, or the identities of, one or more repeat customers of a merchant. In yet another example, the location information is used to determine user regions, such as those geographical areas where users tend to spend a lot of time, or frequently visit.

The network 116 may include one or more wired and/or wireless networks such as the public Internet, local area networks, wide area networks, mobile carrier networks, personal area networks (PAN), and so forth. The mobile device 104 may access the network 116 using various technologies such as through Bluetooth® or other PAN technologies, Wi-Fi® technologies based on the IEEE 802.11 family of standards, Global System of Mobile Communication (GSM) standards-based technologies, code division multiple access (CDMA) mobile phone standards, and so forth. Embodiments of the present disclosure are not limited to any type or types of networking technologies or protocols.

More details regarding these and other embodiments will now be described.

Illustrative Computing System for Providing Location Information

Figure 2:
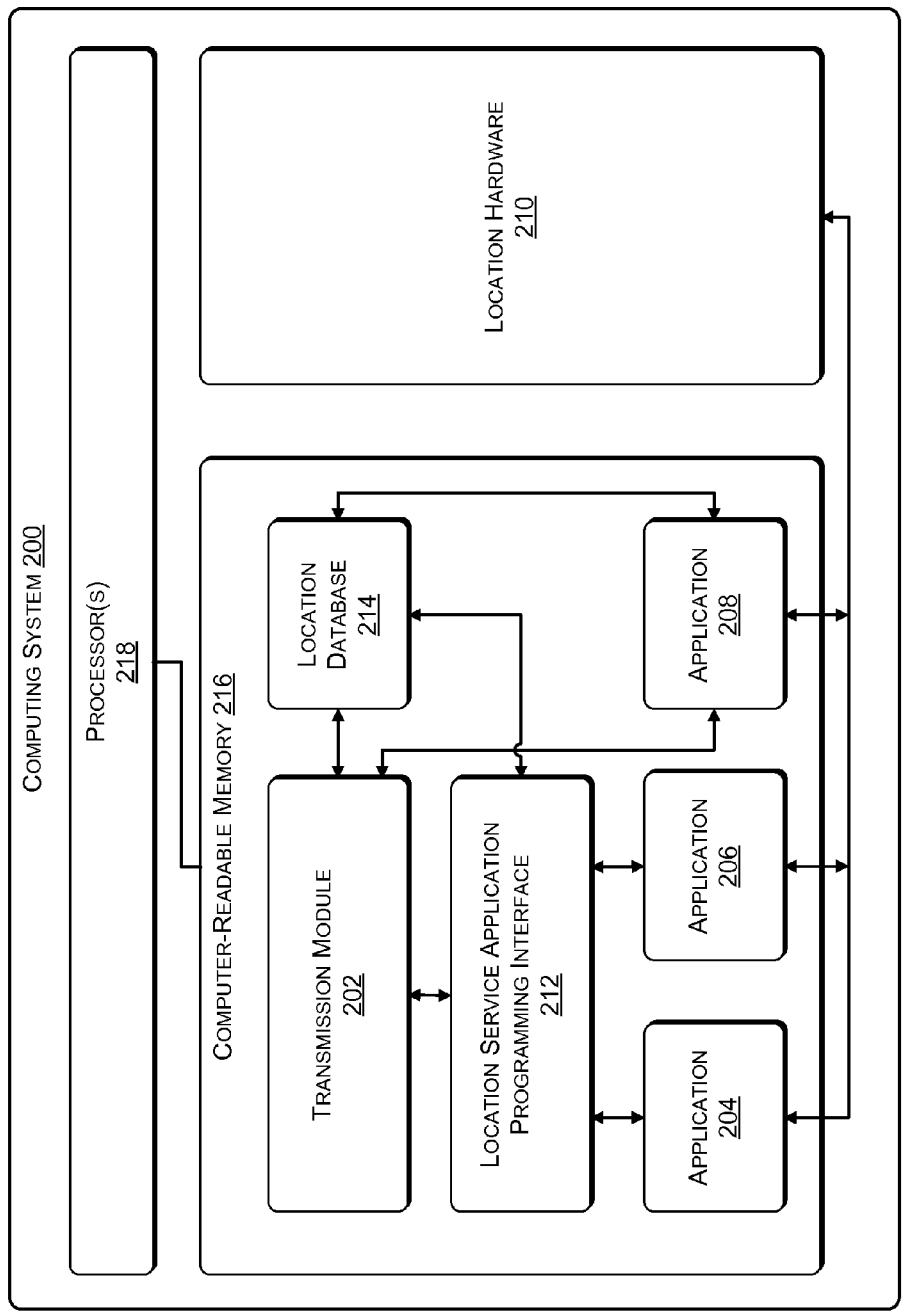
FIG. 2 shows a computing system for providing location information according to embodiments.

FIG. 2 shows computing system 200 for providing location information according to embodiments. Computing system 200 may be the same as or similar to the mobile device 104. A transmission module 202 is configured to transmit data, such as over a communication network, using one or more communications protocols and technologies. Applications 204, 206, and 208 have primary functions or portions, unrelated to location services, and secondary location-related portions or functions (such as querying the location hardware 210 for location information and causing the location information to be transmitted to a location service). The location-related functions of the applications 204-208 determine location data such as by querying the location hardware 210. The applications 204-208 may query the location hardware periodically, continuously, or responsive to a request, such as a request from a location service, such as the location service 112. The applications 204-208 may be executable to receive location data in the form of input from a user. A location service application programming interface (API) 212 enables the applications 204 and 206 to cause transmission of the location information to the location service.

The location service API 212 simplifies the process of sharing the location information with the location service. The location service API 212 responds to calls from the applications 204 and 206 to transmit the location information by, in part, invoking the transmission module 202 to transmit the location information. The location service API 212 includes a resource identifier (such as a URI or URL) of the location service. Thus, an application developer that develops the applications 204 and 206 need not program those applications with the resource identifier of the location service and/or provide the applications 204 and 206 with the capability to query for or be updated with a new resource identifier for the resource service. The application 208 communicates directly with the transmission module 202 to transmit the location information to the location service. The computing system may include more or fewer applications, similar to applications 204 and 206, that communicate via the location service API. And the computing system 200 may include more or fewer applications, similar to application 208, that communicate directly via the transmission module.

The location service API 212 may be installed on the computing system 200 along with one or more of the applications 204-208. Alternatively, the location service API 212 may be installed separately. Having a plurality of applications with the location functionality built-in enables the computing system 200 to provide timelier, more thorough, and more reliable location information to the location service. For example, while application 204 is executing, applications 206 and 208 may not be executing. Later, application 204 may be stopped or suspended during a time that one or more of applications 206 and 208 are executing. Thus, having more than one application with the location functionality built-in increases the amount of time that the computing system 200 is able to provide location information to the location service. In addition, the location-related functions of one or more of the applications 204-208 may be run as background processes during a time that the functions unrelated to location services are not running.

One or more of the applications 204-208 may be third party applications developed by entities that are unaffiliated with the location service. The third party developers may be provided with incentives to build the location functionality into their applications and to provide the location information to the location service. In one example, an application developer may receive compensation for transmitting location information to the location service and for displaying location-specific advertisements presented via the developer's application. Other forms of incentives are available without departing from the scope of embodiments. During installation of the applications 204-208, a user may be prompted to opt into the collection of location information. The user is also provided with the option of disabling the location functionalities of one or more of the applications 204-208.

During a time that the computing system 200 is offline, one or more of the applications 204-208 may query the location hardware 210 for location information. One or more of the applications 204-208 cause transmission of the location information responsive to detecting a transition of the computing system 200 from an offline state to an online state. One or more of the applications 204-208 may store the location information in a location database 214, such as during a time that the computing system 200 is in an offline state (although the applications 204-208 may also store the location information in the location database 214 during a time that the computing system 200 is in an online state.)

Storing the location information in the location database 214 enables any one of the applications 204-208 to transmit all or some of the location information determined by the applications 204-208, even if a different application determined some or all of the location information in the location database 214. Thus, in one example, one application may store location information in the location database 214 during an offline state. Then, a second application may detect a transition from an offline state to an online state, and then cause transmission of the location information stored in the location database 214. In the same or different embodiments, the applications 204-208 may query the location hardware 210 for location information, aggregate it with the location information already stored on the location database 214, and cause transmission of the aggregate location information to the location server. In the same or different embodiments, the applications 204 and 206 may utilize the location service API 212 to cause transmission of the aggregated location information, including the location information provided by other ones of the plurality of applications, to the location server as a periodic batch operation. The applications 204-208 may cause transmission of the location information in real-time as it is received from the location hardware 210, in order to, for example, provide current location data to the location service.

In addition to the location information, one or more of the applications 204-208 also transmits other information associated with the location information. For example, a time stamp or other time data associated with the location information may be stored in the location database 214 and/or transmitted to the location service via the transmission module 202. As noted above, the applications 204-208 include primary functions that are unrelated to location services. These primary functions may generate activity data, and the activity data may be transmitted to the location service along with associated location information. In one example, one of the applications 204-208 is a price-checking application that enables the user to check a price of an item available for purchase at a store, such as by scanning a bar code or manually entering in information about the item available for purchase. The application may thus enable the user to compare a price of the item at the merchant that he or she is currently visiting to a price of the item available with another merchant, such as an online merchant. The activity data generated with this request—such as the item checked, the price of the item at the merchant, and so forth—may be transmitted along with the location information. This activity data may be used in various ways, as is described in more detail below.

As noted above, having multiple applications with location services built-in enables the computing system 200 to provide the location service with timelier, more thorough, and more reliable location information. But if more than one of the applications 204-208 access the location hardware 210 and transmit the location information at the same time, then this may cause unnecessary power usage, processor cycles, and network bandwidth usage. Thus, the applications 204-208 may suppress each other from accessing the location hardware 210. In embodiments, a first one of the applications 204-208 to execute may grab control of the location service update function—such as by updating a flag in the location database 214. The other ones of the applications 204-208 will therefore cede access to the location hardware 210. In another embodiment, presently executing ones of the applications 204-208 may negotiate for control of the location service update function, such as by requesting a token from the other applications, or by some other process.

Illustrative Computing System for Providing a Location Service

Figure 3:
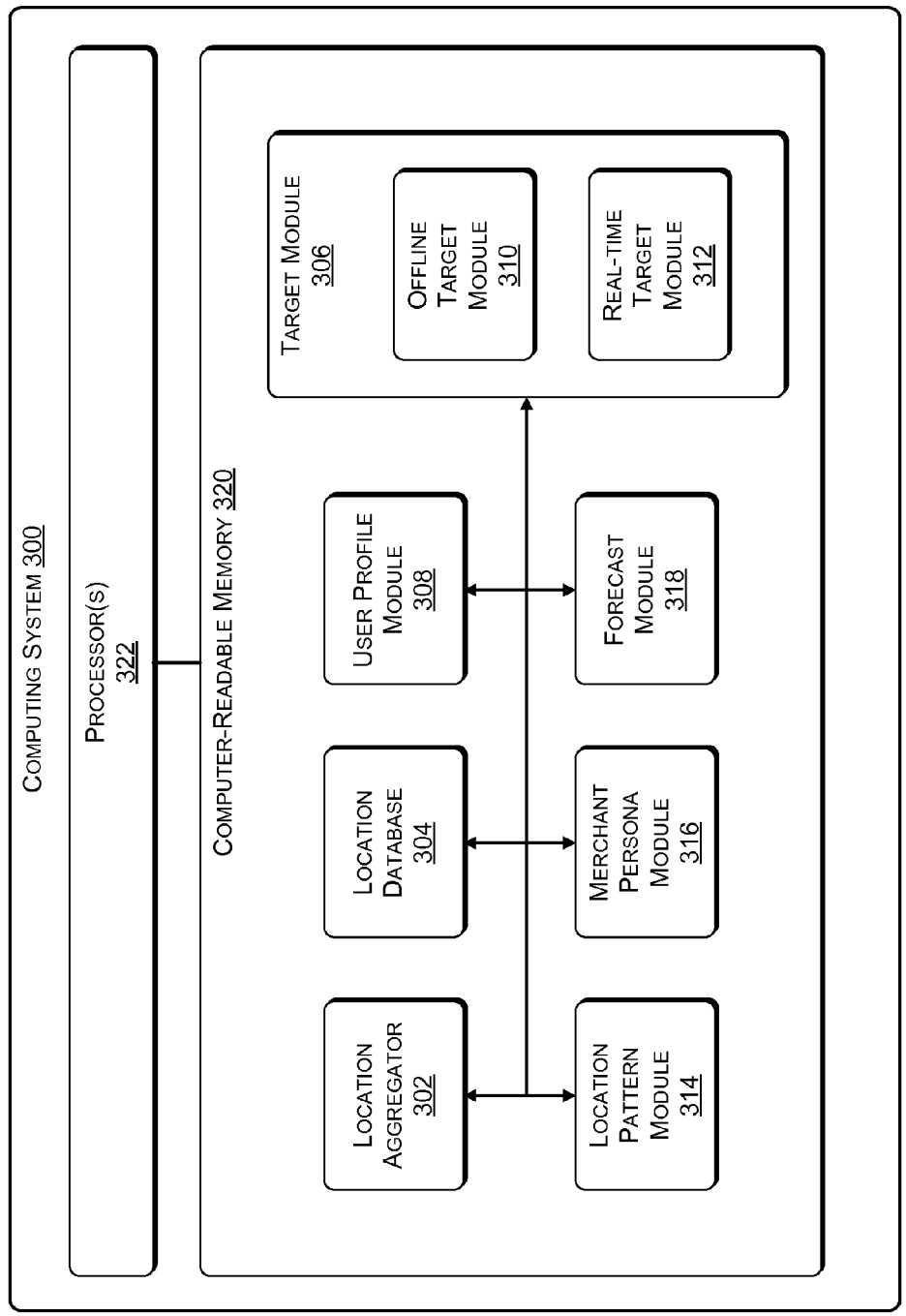
FIG. 3 shows a computing system for providing a location service according to embodiments.

FIG. 3 shows computing system 300 for providing a location service, such as the location service 112, according to embodiments. A location aggregator 302 is configured to receive location information from one or more mobile devices, such as mobile devices 104 and computing system 200. As noted above with respect to FIG. 2, the location information is determined by a plurality of applications of the mobile devices. The location aggregator 302 writes the received location information to a location database 304. The location aggregator 302 receives, from the mobile devices, activity information generated in accordance with at least one of the plurality of applications of the mobile devices. Time-of-day and other information may also be received along with the activity data and the location information. The computing system 300 includes various modules for utilizing the received location information, as will now be described.

A target module 306 causes, based at least in part on the location information associated with a particular mobile device, a target communication to be transmitted to a user associated with the mobile device. The target communication may be an email, a text message, a social networking message, a telephone call, an advertisement or other marketing communication displayed by an application of the mobile device, or other communication type. The information in the target communication may include location-specific information, such as an advertisement or other marketing information. In one example, if the location information indicates that the mobile device is currently at a particular merchant, then the target module 306 may cause an advertisement from the particular merchant to be sent to the mobile device. Alternatively, the target module 306 may cause an advertisement from a competitor of the particular merchant to be sent to the mobile device. The communications may be from one or more sources or entities. For example, the target module 306 may choose between advertisements or other communications from one or more advertisers, one or more deal purveyors, one or more deal aggregators, and so forth. The target module 306 may weigh different inputs, including location data inputs, to determine the communication to be sent to the user.

A user profile module 308 determines based at least in part on the location information for a particular mobile device, a user profile associated with a user of the mobile device. The target module 306 selects the target communication, and causes the target communication to be transmitted to the user, based at least on the user profile. The user profile may include information such as geographic areas that the user frequently travels in and merchants that the user frequently visits. The user profile module 308 may infer, based at least on location information, time data, and/or activity data associated with the location information, one or more of the user's work location, home location, merchant associations, types of stores the user typically visits, one or more frequently visited geographical areas, and so forth. The user profile module may infer this and other information, for example, based on past location data showing a number of visits to a particular location or area exceeding a predetermined threshold.

The target module 306 includes an offline target module 310 and a real-time target module 312. The offline target module 310 is configured to target advertisements to users based at least on their user profiles, merchant personas, social networking information, and so forth. The offline target module 310 matches a target communication with a target audience. In one embodiment, the offline target module 310 searches a plurality of user profiles for users that are in a target audience defined as users that travel to, work in, or live in certain geographical areas (such as a portion of a city, county, state, or country), and transmits a target communication to those users. In one example, the offline target module 310 searches for users that work in a downtown area of a city in order to transmit an advertisement for a new restaurant in the downtown area. The advertisement may include a lunch special to specifically target users who work near the restaurant. Thus, the offline target module determines a predicted future location of the user (the downtown area) based on past location data associated with the user's mobile device (the user's inferred work location), and targets the communication to the user based at least in part on the predicted future location.

In embodiments, the offline target module 310 utilizes activity data associated with the location data to target communications to the user. In one example, the activity data may indicate that a user previously checked the price of a particular item using a price checker application at one or more merchant locations. Thus, the offline target module 310 may target an advertisement or an offer for the particular item based on this information. Also, activity data may indicate a time of day that the user typically checks their messages, and may transmit the communication before such a time. Thus, a time-sensitive communication (such as for a time-limited offer) can be transmitted to the user in a timely manner that gives the user an opportunity to view it before the information becomes obsolete. The offline target module 310 utilizes social networking data or data derived from social networking data, such as location data of contacts within the user's social network, to determine communications to be sent to the user. The offline target module 310 utilizes merchant popularity, such as the number of visits by all users, or a subset of users having similar user profiles as the user, to the merchant target communications to the user. Other examples may be utilized without departing from the scope of embodiments.

The real-time target module 312 targets communications to users based at least on more current or real-time location information. The real-time target module 312 receives the current location from the location aggregator and causes a communication to be transmitted to the user based at least in part on a current location or a predicted future location area determined from the current location. In embodiments, the real-time target module 312 determines the predicted future location area further based at least on a direction and/or speed of travel of the mobile device. The real-time target module 312 may further base the communication targeting on the user profile, current location information, past location information, activity data, a current time, past visits to a location exceeding a predetermined threshold, or other information. In one example, the real-time target module 312 may determine that a user is at work and headed to lunch based on the inferred work location in the user profile, current location information indicating that the user is currently at work and moving towards the entrance of the building, and the time of day (such as between 11:30 AM and 1:30 PM). In this example, the user profile may indicate that the user is associated with three different food merchants during lunch time, and the real-time target module 312 may therefore cause an advertisement for a restaurant in the same general area as the three food merchants to be transmitted to the user based on this information. The online target module 312 utilizes social networking data or data derived from social networking data, such as location data of contacts within the user's social network, to determine communications to be sent to the user. The offline target module 312 utilizes merchant popularity, such as the number of visits by all users, or a subset of users having similar user profiles as the user, to the merchant target communications to the user. Other examples may be utilized without departing from the scope of embodiments.

A location pattern module 314 utilizes location data received from a plurality of mobile devices to determine patterns, and to make various inferences. In embodiments, the location pattern module 314 infers an existence of a merchant at a particular location based at least in part on the aggregated location information indicating an incidence of past visits to the particular location exceeding a predetermined threshold. For example, if the aggregated location data indicates that more than a predetermined number of users have previously visited a particular location for which there is no current merchant information, then the location pattern module 314 infers that there is a merchant at the particular location. The location pattern module 314 may utilize activity data associated with the location data to infer additional information about the merchant. For example, if the activity data shows that many users perform price checks on electronic items while at the location, then the location pattern module 314 may infer that the merchant sells electronic items. Information about an inferred merchant may be used to generate sales leads for those inferred merchants, to bring more merchants into an advertisement targeting service provided by the location service.

In embodiments, the location pattern module 314 determines numbers of and/or identities of repeat customers for a merchant based at least in part on the aggregated location information. For example, if the aggregated location information indicates that a particular user visits a particular merchant within a certain time frame more than a predetermined threshold number of times (or at a rate that meets or exceeds a predetermined rate), then the user is determined to be a repeat customer. The location pattern module 314 may determine this directly from the location information or from the user profiles generated by the user profile module 308. The location pattern module 314 may determine all users who are repeat customers of a merchant, and utilize their identities to target communications, or for other purposes such as to determine merchants with a large number of repeat visits. The location pattern module 314 may determine a correlation between target communications sent to a population of users and the number of those users that become repeat customers.

In embodiments, the location pattern module 314 determines one or more user regions, areas, or boundaries having a high incidence of user visits based at least on the aggregated location information. The location information may indicate that an area or location is associated with a number of past user visits that exceeds a predetermined threshold, thereby indicating that the area or the location is a high-traffic area. Alternatively or in addition, different areas can be identified as being unique areas, based on for example location information showing that a first group of users tend to stay within a first area and that a second group of users tend to stay within a second area, and so forth.

A merchant persona module 316 utilizes the location data to characterize merchants. The merchant persona module 316 determines characteristics of users who visit a particular merchant. For example, the distances that users tend to travel to visit the merchant, geographical areas that users who visit the merchant live in, work in, or travel to, and so forth. The merchant persona module 316 may determine a merchant popularity, based for example on social networking data associated with the merchant (e.g., the number of "likes" that a particular merchant receives on one or more social networking or rating services). The popularity may be based on the aggregated location data, such as the number of visits by all users, the number of repeat customers, the number of repeat visits, and so forth.

The target module 306 may utilize the merchant personas to target communications to users, such as by identifying a target audience for an advertisement or offer based on users whose location data matches the characteristics of the merchant persona. For example, if a merchant persona shows that a certain percentage (such as for example 50%, 75%, 80% or other percent) of users typically travel within a 10-mile radius to visit a merchant, then the target module 306 may target communications to users who live or work within a 10-mile radius of the merchant. In another example, if a merchant persona indicates that users who live in a certain neighborhood (geographical area) are more likely than users who live in other neighborhoods to visit a merchant, then the target module 306 may target communications to users who live within the neighborhood. The target module 306 may utilize the merchant popularity to determine a communication to be sent to the user. The target module 306 may cause the popularity information to be included in the communication sent to the user.

The merchant persona module 316 may determine communities of users who frequent a particular merchant, location, or area and suggest social networking contacts between users within the communities. This information may be used to organize meet-ups between users within the communities, such as at a particular merchant location.

The merchant persona module 316 may determine relationships between merchants, such as by identifying from location information merchants that share users in common. The target module 306 may target communications regarding a first merchant to users who have visited a second merchant, where the second merchant has a determined relationship, based on location patterns, with the first merchant.

In various embodiments, the real-time target module 312 utilizes activity that is associated with the location data to target communications to the user. For example, the activity data may indicate that a user has recently checked the price of an item for sale at a particular merchant location. The real-time target module 312 may then cause a target communication regarding an advertisement or offer for the item to be sent to the user. The target advertisement or offer may include information about the item, a discount offer from the merchant, an offer for the item from another merchant, such as an online merchant, and so forth.

In another example, the real-time target module 312 may determine from past activity data that the user has previously checked the price of an item more than a predetermined number of times at one or more merchant locations. The real-time target module 312 may then determine from the location information that the user is predicted to be travelling towards a location or area with a merchant that sells or possibly sells the item. The real-time target module 312 may then cause a target communication to be sent to the user with an advertisement or offer regarding the item, such as an offer from the same or different merchant.

A forecast module 318 forecasts—based at least in part on one or more of the location information, the user personas, and the merchant personas, and patterns identified by the location pattern module 314—the efficacy of target communications. For example, the forecast module 318 may forecast how effective a particular target communication for a particular merchant may be based on the number of users that frequently travel within a geographic area of the particular merchant and the number of users who visit similar stores, the average distances users travel, and so forth.

In embodiments, one or more components of FIG. 3 may be accessible to third parties via an API, or by other means. For example, the target module 306 may be accessible to third parties to target their communications to the users, based for example on the location database. The location database 304 may be provided directly to third parties to, for example, enable the third parties to target communications utilizing their own metrics, weightings, and additional inputs. Merchant personas, user profiles, and so forth may in various embodiments be made available to third parties for various purposes.

In embodiments, computer-readable memory 216 and 320 may include volatile memory (such as RAM), nonvolatile memory, removable memory, and/or non-removable memory, implemented in any method or technology for storage of information, such as computer-readable instructions, data structures, program modules, or other data. Also, the processor(s) 218 and 322 may include onboard memory in addition to or instead of the computer-readable memory 216 and 320. Some examples of storage media that may be included in the computer-readable memory 216 and 320 and/or processor(s) 218 and 322 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium usable to store the desired information and that can be accessed by the computing systems 200 and 300. Any such computer-readable media may be part of the computing systems 200 and 300.

The computer-readable memory 216 and 320, meanwhile, may include software programs or other executable modules that may be executed by the processor(s) 218 and 322. Examples of such programs or modules include control modules (e.g., power management), network connection software, an operating system, sensor algorithms, and so forth.

The computer-readable memory 216 and 320 may also be used to store various databases, such as the location databases 214 and 304.

Various processes, instructions, methods and techniques described herein may be considered in the general context of computer-executable instructions, such as program modules, that are executable by one or more computers or other devices. Generally, program modules include routines, programs, objects, components, data structures, etc. for performing particular tasks or implementing particular abstract data types. These program modules can be implemented as software modules that are executable on the processor(s) 218 and 322, as hardware, and/or as firmware. Typically, the functionality of the program modules may be combined or distributed as desired in various embodiments. An implementation of these modules and techniques may be stored on or transmitted across some form of computer-readable media.

The modules stored in computer-readable memory 216 and 320 may be implemented across one or more servers in a cloud computing environment, on a local device, or on a combination of both. The following discussion does not limit the implementation of the modules stored in computer-readable memory 216 and 320 to any particular device or environment.

Illustrative Target Communication

Figure 4:
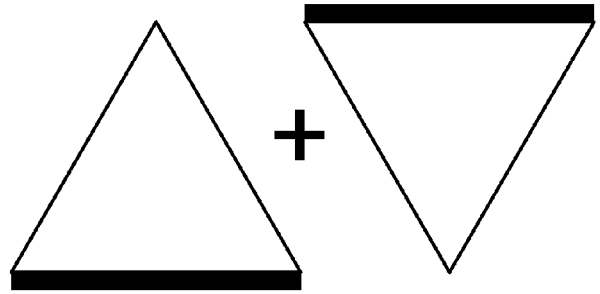
FIG. 4 shows an illustrative target communication sent to a user based on location information.
Figure 4:
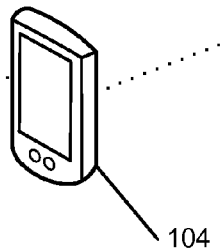

FIG. 4 shows an illustrative target communication 400 sent to a user based on location information. The target communication 400 includes a message 402 that invites the user John Q. Public to visit Bob's Pizza Kitchen for a special lunch-time deal. A target module, such as the real-time target module 312, may determine from one or more of a user profile, a time of day, a merchant persona, and current location information that John Q. Public is currently at work, that the current time is at or near a typical lunch time, and that John Q. Public is moving towards the entrance of his building. The target module determines restaurants that are highly rated by other users who have similar user profiles as John Q. Public. The target module may then utilize some or all of that information to cause the target communication 400 to be transmitted to John based on John's past location data that shows that he typically visits restaurants in the same area or location as Bob's Pizza Kitchen.

The illustrative target communication 400 is an example only, and other target communications, with other content may be used, and transmitted based on other location data and location data inferences, without departing from embodiments. For example, the target communication 400 may be based on, and include information regarding, social networking data. In embodiments, the social networking data may include data indicating that contacts in one or more of John Q. Public's social network like or frequently visit Bob's Pizza Kitchen, or restaurants similar to Bob's Pizza Kitchen. The target module may cause the target communication 400 to be sent based on this social networking data.

Illustrative Target Communication

Figure 5:
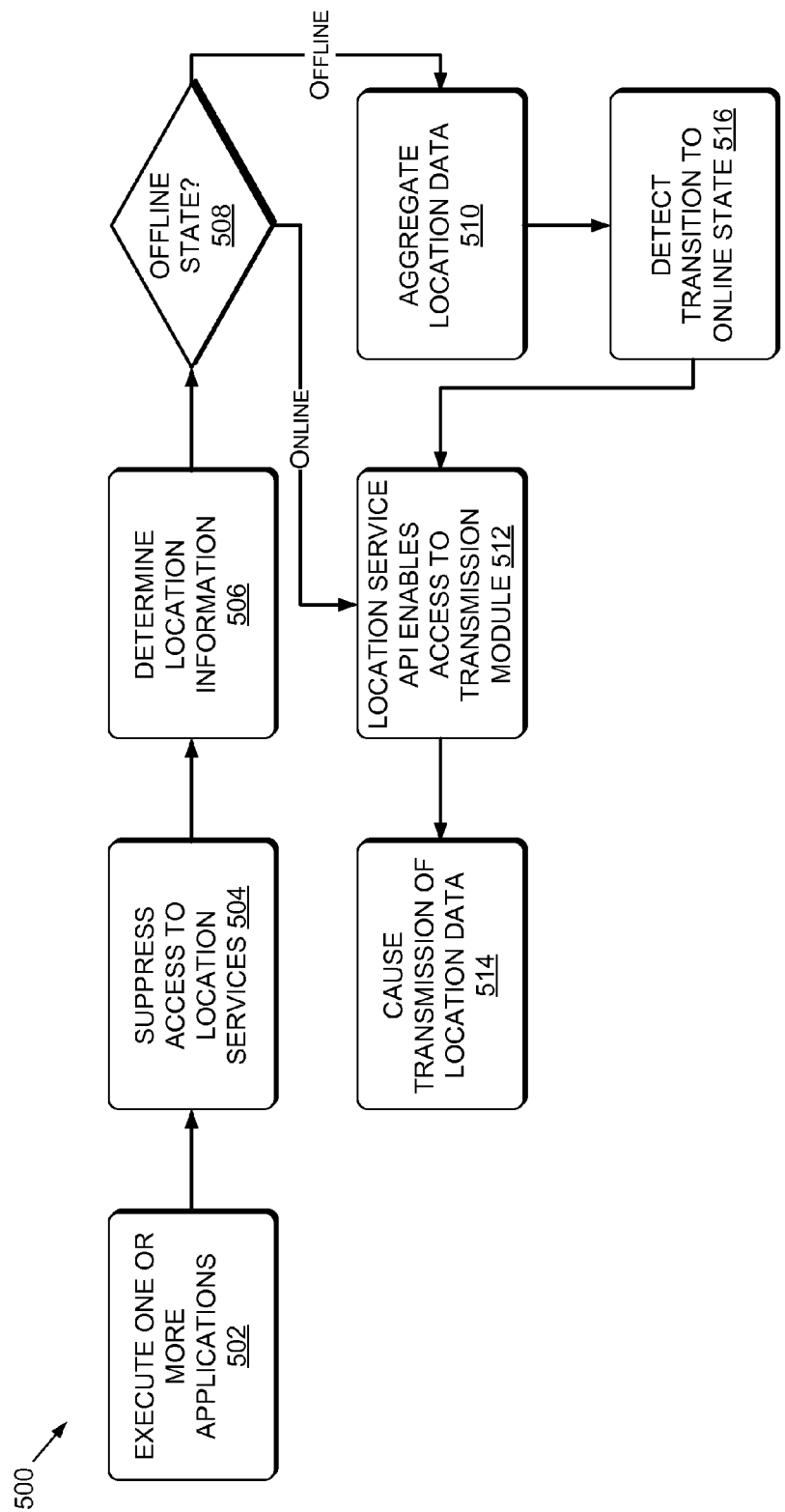
FIG. 5 shows an illustrative process for providing location information from a mobile device, according to embodiments.

FIG. 5 shows an illustrative process 500 for providing location information from a mobile device, according to embodiments. The process 500 is described with reference to the preceding figures, and specifically with reference to FIGS. 1-3. The process 500 is illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure. Other processes described throughout this disclosure, such as in FIG. 6, shall be interpreted accordingly.

At 502, a plurality of applications such as application(s) 108, 204, 206, and 208, are executed on a computing device, such as the computing device 200 and the mobile device 104. In embodiments, this may include executing a location function of at least one of the one or more applications as a background process during a time that a non-location function of the application does not execute, as is described in more detail elsewhere within this Detailed Description.

At 504, access to the location hardware for other ones of the plurality of applications is suppressed upon a determination that more than one of the plurality of applications are actively executing, as is described elsewhere within this Detailed Description.

At 506, the plurality of applications, or just those applications whose access to the location services is not suppressed, determines location information associated with the computing device. The applications may determine the location by querying location hardware, such as the location hardware 106 and 210, of the computing device, such as GPS hardware, network locator hardware, or by other means such as triangulating coordinates from signal strengths, IP address location associations, or manually input location data. The applications may determine the information at different times, such as during times that those applications execute. Alternatively, the applications may determine the location at the same time. As noted above, embodiments may include mechanisms to suppress location determination by more than one application at a given point in time.

At 508, one or more of the applications determine whether the computing device is in an offline state. The computing device may be offline because a wireless capability of the computing device is turned off (e.g., the device is in an "airplane mode"), the computing device is out of range of a wireless signal, or for other reasons.

At 510, one or more of the applications aggregates location information determined by the plurality of applications. The location information may be written to a location database, such as the location database 304, by the applications. Aggregating the location information may include writing newly determined location information to other location information already stored on the location database. Aggregating the location data may occur during an offline state of the computing device, although in embodiments the location data aggregation may occur during an online state.

At 512, a location service API enables one of the plurality of applications to access a transmission module, such as the transmission module 114, to cause the transmission of the location information to the location service. The location service API is responsive to calls from the plurality of applications, and the location service API simplifies the process of transmitting the location information to the location service. For example, the location service API has a resource identifier (such as a URI or URL) for the location service, and is configured to establish a predetermined type of network connection via a communication network with the location service. In embodiments, one or more of the applications may not utilize the location service API as discussed in more detail elsewhere within this Detailed Description.

At 514, the one or more applications cause transmission of the location information to a location service via a communication network. Causing transmission of the location information includes, in embodiments, accessing the transmission module directly. In other embodiments, causing transmission of the location information includes calling a location service API. The location information may be transmitted as a batch process, or substantially contemporaneously with the determination of the location information (i.e., in "real time").

At 516, one or more of the applications detects a transition from an offline state to an online state of the computing device. Responsive to a determination of a transition, the process passes to 512 and 514 to cause transmission of the location data. The location data may be caused to be transmitted as a batch process and by a different application than determined the location information. In one example, a first application may determine first location information at a first time during an offline state, a second application may determine second location information at a second time during the offline state, and a third application may take control of location services, detect a transition to an online state, and cause the first and second location information to be transmitted. Other examples are possible without departing from the scope of embodiments.

The aforementioned techniques include a set of illustrative techniques for providing location data to a location service. However other known techniques may be employed to accomplish similar results.

Illustrative Operation for Targeting Communication

Figure 6:
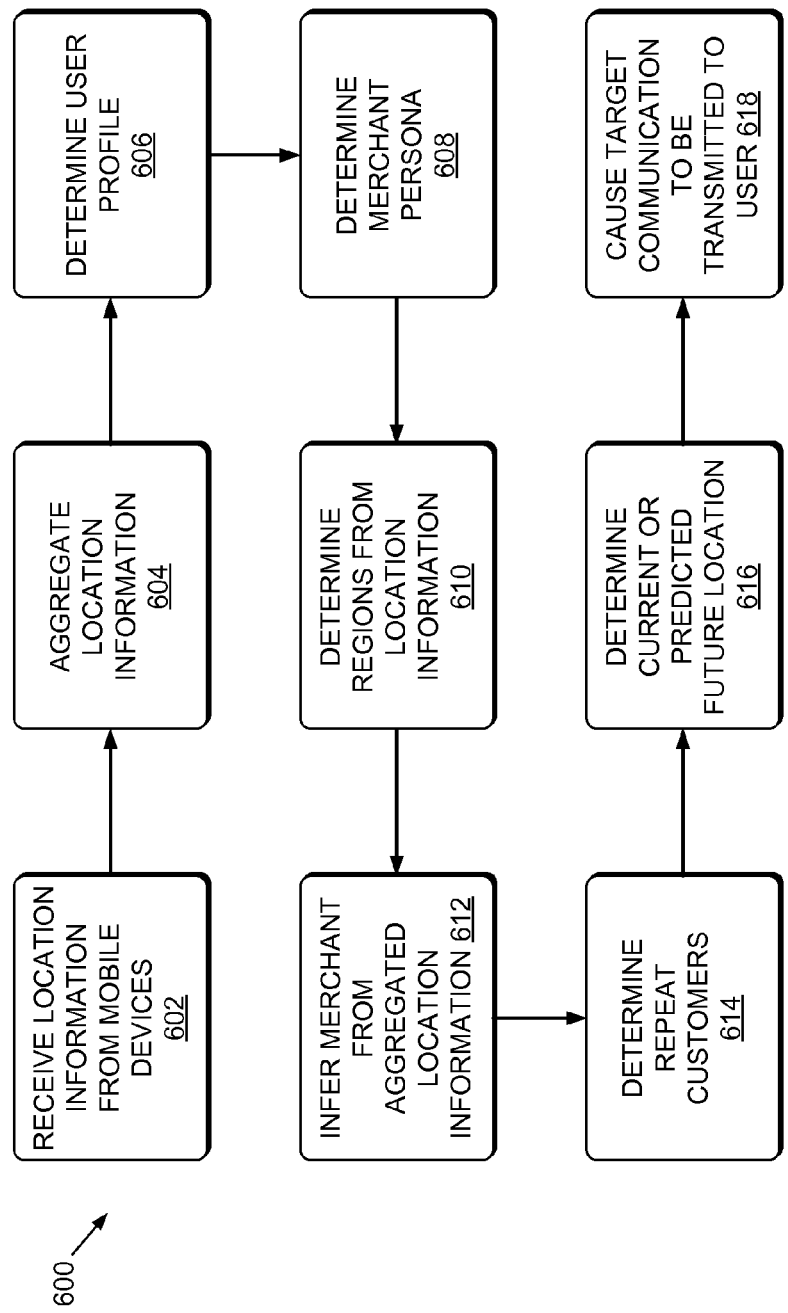
FIG. 6 shows an illustrative operation for targeting communication based on aggregated location information.

FIG. 6 shows an illustrative operation 600 for targeting communication based on aggregated location information. At 602, a location aggregator, such as the location aggregators 118 and 302, receive locations information from a plurality of mobile devices. The location information is determined by a plurality of applications of the mobile device. The location aggregator may receive activity information that is associated with the location information, as is described elsewhere within this Detailed Description.

At 604, the location aggregator aggregates the location information, and any other associated information received along with the location information, such as time data, activity data, and so forth. This may include writing the location information and associated information to a location database, such as the location database 304.

At 606, a user profile module, such as the user profile module 308, determines, based at least on the location information, user profiles associated with one or more users of the mobile devices. The user profile module develops the user profiles based at least on inferences and other techniques described within this Detailed Description. For example, the user profile module infers, at least from the location information, one or more of a work location, a home location, a merchant association, or a frequently visited geographical area.

At 608, a merchant persona module, such as the merchant persona module 316, utilizes the location data to characterize merchants and to determine merchant personas. The merchant persona module determines characteristics of users who visit a particular merchant. For example, the merchant persona module determines the average distances that users tend to travel to visit the merchant, geographical areas that users who visit the merchant live in, work in, travel to, and so forth.

At 610, a location pattern module, such as the location pattern module 314, determines one or more user regions having a high incidence of user visits based at least on the aggregated location information. The location pattern module may determine a region based on the location information indicating a number of past user visits exceeding a predetermined threshold.

At 612, the location pattern module infers an existence of a merchant at a particular location based at least in part on the aggregated location information. The aggregated location information may indicate that a number of past visits to the particular location exceed a predetermined threshold. For example, the location information may indicate that a particular location having no known merchant receives a large number of user visits from multiple users. The location pattern module may infer from this that an unknown merchant is at the location.

At 614, the location pattern module determines a number of, identities of and/or characteristics of repeat customers for a merchant based at least in part on the aggregated location information. The aggregated location information may show a number of repeat visits by one or more users within a predetermined time frame that exceeds a predetermined threshold, and the location pattern module may thus determine that these users are repeat customers.

At 616, the target module determines a current location or a predicted future location of a particular user from the location information. The predicted future location may be determined from a current location, past location data, a direction of travel, a speed of travel, information in the user profile, a number of previous visits to a predicted future location, activity information associated with the location information, frequented geographical areas, inferred place of work, home, merchant associations, and so forth (some or all of which may be included in the user profile).

At 618, the target module causes a target communication to be transmitted to the user based at least in part on the location information. The target communication may be selected based on a current or a predicted future location or area determined at 616. The target module may select a target communication based on a target audience (which may be based on a merchant persona), distances typically traveled by the user, region information, repeat customer information, and based on other factors as described within this Detailed Description.

The aforementioned techniques include a set of illustrative techniques for determining location information by a plurality of applications of a mobile device, targeting communications based on the location information, and inferring user profiles, merchant personas, user regions, and other information based at least on the location information. However other known techniques may be employed to accomplish similar results.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computing device, comprising:
   memory;
   one or more processors;
   a transmission module stored in the memory and executable by the one or more processors to enable transmissions via a communication network;
   a database stored in the memory to include aggregated location information corresponding to the computing device;
   a first application stored in the memory and executable by the one or more processors to query location hardware of the computing device to determine first location information corresponding to the computing device, and to store the first location information in the database as part of the aggregated location information;
   a second application stored in the memory and executable by the one or more processors to query the location hardware of the computing device to determine second location information corresponding to the computing device, and to store the second location information in the database as part of the aggregated location information; and
   a location service application programming interface (API) stored in the memory and executable by the one or more processors to enable the first application and the second application to provide, via the transmission module, the aggregated location information, including the first location information and the second location information, respectively, to a location service.

2. The computing device of claim 1, wherein the first application is further executable to periodically query the location hardware for the first location information.

3. The computing device of claim 1, wherein the first application includes a first portion that is executable to perform a function unrelated to querying the location hardware and causing transmission of the location information, and wherein at least a second portion of the first application associated with querying the location hardware and causing transmission of the location information is executable to run as a background process.

4. The computing device of claim 1, wherein the first application includes a first portion that is executable to perform a function unrelated to querying the location hardware and causing transmission of the location information; and
   wherein a second portion of the first application is further executable to call the location service API to cause transmission of both the first location data and activity data associated with the function that is unrelated to querying the location hardware and causing transmission of the location information.

5. A computing device, comprising:
   memory;
   one or more processors;
   a transmission module stored in the memory and executable by the one or more processors to enable a plurality of applications to transmit data via a communication network;
   a database stored in the memory, the database to include aggregated location information;
   the plurality of applications stored in the memory and executable by the one or more processors to:
   query a location hardware of the computing device to determine location information associated with the computing device;
   store the location information in the database as part of the aggregated location information; and
   cause the transmission of the aggregated location information to a location service via the transmission module.

6. The computing device of claim 5, wherein the aggregated location information that is transmitted to the location service is stored in the database by multiple ones of the plurality of applications.

7. The computing device of claim 5, wherein two or more of the plurality of applications include first portions executable to perform primary functions unrelated to location information, and second portions that are executable in a background to query the location hardware, store the location data in the database as part of the aggregated location information, and cause the transmission of the aggregated location information to the location service, and wherein the primary functions of the first portions are different from one another.

8. The computing device of claim 5, wherein one or more of the plurality of applications include first portions executable to perform primary functions unrelated to location information, and second portions executable to query the location hardware, store the location data in the database as part of the aggregated location information, and cause the transmission of the aggregated location information to the location service, and wherein the one or more of the plurality of applications are further executable to cause transmission of the location information to the location service along with activity data associated with the first portions.

9. The computing device of claim 5, wherein the plurality of applications are further executable to store the location information in the database during an offline state and to cause transmission of the aggregated location information to the location service responsive to detecting a transition of the computing device from the offline state to an online state.

10. The computing device of claim 5, wherein the plurality of applications are further executable to cause transmission of the aggregated location information to the location service as a periodic batch operation.

11. The computing device of claim 5, wherein the plurality of applications are further executable to cause transmission of the location information in real time as the location information is received from the location hardware.

12. The computing device of claim 5, further comprising a location service application programming interface (API) stored in the memory and executable by the one or more processors to enable one or more of the plurality of applications to transmit the location information to the location service, and wherein the one or more applications are further executable to utilize the location service API to transmit the location information to the location service.

13. A method, comprising:
   determining, by a plurality of applications of a computing device based on queries to a location hardware of the computing device, location information associated with the computing device;
   storing, by ones of the plurality of applications, the location information in a database of the computing device, the location information forming aggregated location information; and
   causing, by at least one of the plurality of applications, transmission of the aggregated location information to a location service via a communication network.

14. The method of claim 13, wherein the storing includes aggregating first location information determined by a first one of the plurality of applications with second location information determined and stored in the database by a second one of the plurality of applications.

15. The method of claim 13, wherein the storing of the location information in the database occurs during an offline state of the computing device, and the method further comprises detecting a transition from the offline state to an online state of the computing device, wherein the causing the transmission is responsive to the transition.

16. The method of claim 15, wherein the aggregated location information includes a first location of the computing device associated with a first time of the offline state and a second location of the computing device associated with a second time of the offline state.

17. The method of claim 13, further comprising enabling, by a location service API, one of the plurality of applications to access a transmission module of the computing device to cause, responsive to calls from the plurality of applications, the transmission of the location information to the location service, the location service API including a resource identifier of the location service.

18. The method of claim 13, wherein the causing includes causing transmission of the location information substantially contemporaneously with the determination of the location information.

19. The method of claim 13, further comprising suppressing, by one of the plurality of applications, access to the location hardware for other ones of the plurality of applications during a time that the one of the plurality of applications is actively executing.

20. The method of claim 13, further comprising executing a location function of at least one of the one or more applications as a background process during a time that a non-location function of the at least one application does not execute.

21. A location service, comprising:
    memory;
    one or more processors;
    a location aggregator stored in the memory and executable by the one or more processors to receive, from a plurality of mobile devices, location information associated with individual ones of the plurality of the mobile devices, the location information associated with individual ones of the plurality of mobile devices aggregated by a plurality of applications of individual ones of the mobile devices prior to transmission to the location aggregator; and
    a target module stored in the memory and executable to cause, based at least in part on the location information associated with individual ones of the plurality of mobile devices, a target communications to be transmitted to users associated with the plurality of mobile devices.

22. The location service of claim 21, further comprising a user profile module stored in the memory and executable by the one or more processors to determine, based at least on the location information associated with individual ones of the plurality of mobile devices, user profiles associated with individual ones of the users of the plurality of mobile devices, and wherein the target module is further executable to cause the target communications to be transmitted to the users associated with the mobile devices based at least on the user profiles.

23. The location service of claim 22, wherein the user profile module is configured to infer, at least from the location information of at least one of the mobile devices, one or more of a work location, a home location, a merchant association, or a frequently visited geographical area of the at least one of the mobile devices, and wherein the target module is further executable to cause one of the target communications to be transmitted to the at least one of the mobile devices based at least on the one or more of inferred work location, inferred home location, inferred merchant association, or inferred frequently visited geographical area.

24. The location service of claim 21, wherein the location information indicates a current location of at least one of the mobile devices, and wherein the target module is further executable to cause the target communication to be transmitted to the users based at least in part on a predicted future location area determined from the current location.

25. The location service of claim 24, wherein the target module is further executable to determine the predicted future location area further based at least on one or more of a speed of travel of the at least one of the mobile devices or a direction of travel of the at least one of the mobile devices.

26. The location service of claim 24, wherein the target module is further executable to determine the predicted future location area further based at least on past location data associated with the at least one of the mobile devices that indicates a number of previous visits to the predicted future location exceeding a predetermined threshold.

27. The location service of claim 21, wherein the location aggregator is further executable to receive, from at least one of the mobile devices, activity information generated in accordance with at least one of the plurality of applications of the at least one of the mobile devices, and wherein the target module is further executable to cause a corresponding one of the target communications to be transmitted further based at least on the activity information.

28. The location service of claim 27, wherein the activity data is associated with an item for sale at a location, or a predicted future location, of the at least one of the user devices determined from the location information, and wherein the corresponding one of the target communications includes information about the item.

29. The location service of claim 21, wherein the computing device further comprises a location pattern module stored in the memory and executable by the one or more processors to infer an existence of a merchant at a particular location based at least in part on the location information of the plurality of mobile devices indicating a number of past visits to the particular location exceeding a predetermined threshold.

30. The location service of claim 21, wherein the computing device further comprises a location pattern module stored in the memory and executable by the one or more processors to determine identities of repeat customers for a merchant based at least in part on the location information of the plurality of mobile devices indicating a number of repeat visits within a predetermined time frame exceeding a predetermined threshold.

31. The location service of claim 21, wherein the computing device further comprises a location pattern module stored in the memory and executable by the one or more processors to determine one or more user regions based at least on the location information of the plurality of mobile devices for the one or more regions indicating a number of past user visits exceeding a predetermined threshold.

* * * * *